United States Patent
Chen et al.

(10) Patent No.: US 7,497,008 B2
(45) Date of Patent: Mar. 3, 2009

(54) METHOD OF FABRICATING A THIN FILM MAGNETIC SENSOR ON A WAFER

(75) Inventors: Tsung Yuan Chen, San Jose, CA (US); Frederick Hayes Dill, San Jose, CA (US); James Mac Freitag, Sunnyvale, CA (US); Kuok San Ho, Santa Clara, CA (US); Wipul Pemsiri Jayasekara, Los Gatos, CA (US); Kim Y. Lee, Fremont, CA (US); Mustafa Michael Pinarbasi, Morgan Hill, CA (US); Ching Hwa Tsang, Sunnyvale, CA (US); Patrick Rush Webb, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 541 days.

(21) Appl. No.: 11/211,877

(22) Filed: Aug. 24, 2005

(65) Prior Publication Data

US 2007/0048624 A1 Mar. 1, 2007

(51) Int. Cl.
*G11B 5/127* (2006.01)
*H04R 31/00* (2006.01)

(52) U.S. Cl. ............ 29/603.16; 29/603.13; 29/603.14; 29/603.15; 29/603.18; 360/324.11; 360/324.12; 360/324.2; 360/325; 360/327; 216/62; 216/65; 216/66; 451/5; 451/41

(58) Field of Classification Search ............ 29/603.07, 29/603.13–603.16, 603.18, 603.27, 607, 29/609; 360/324.11, 324.12, 324.2, 324.21, 360/325–327

See application file for complete search history.

(56) References Cited

U.S. PATENT DOCUMENTS

| | | | |
|---|---|---|---|
| 7,194,797 B2 * | 3/2007 | Pinarbasi | 29/603.14 |
| 2003/0011943 A1 | 1/2003 | Webb et al. | |
| 2003/0182790 A1 * | 10/2003 | Hsiao et al. | 29/603.15 |
| 2004/0061987 A1 * | 4/2004 | Mauri et al. | 360/324.12 |
| 2004/0257713 A1 | 12/2004 | Pinarbasi | |
| 2005/0007706 A1 | 1/2005 | Dovek et al. | |
| 2005/0135019 A1 | 6/2005 | Zolla et al. | |

* cited by examiner

*Primary Examiner*—Paul D Kim
(74) *Attorney, Agent, or Firm*—G. Martin Knight

(57) ABSTRACT

An embodiment of the invention is a magnetic head with overlaid lead pads that contact the top surface of the sensor between the hardbias structures and do not contact the hardbias structures which are electrically insulated from direct contact with the sensor. The lead pad contact area on the top of the sensor is defined by sidewall deposition of a conductive material to form leads pads on a photoresist prior to formation of the remainder of the leads. The conductive material for the lead pads is deposited at a shallow angle to maximize the sidewall deposition on the photoresist, then ion-milled at a high angle to remove the conductive material from the field while leaving the sidewall material. An insulation layer is deposited on the lead material at a high angle, then milled at a shallow angle to remove insulation from the sidewall.

10 Claims, 5 Drawing Sheets

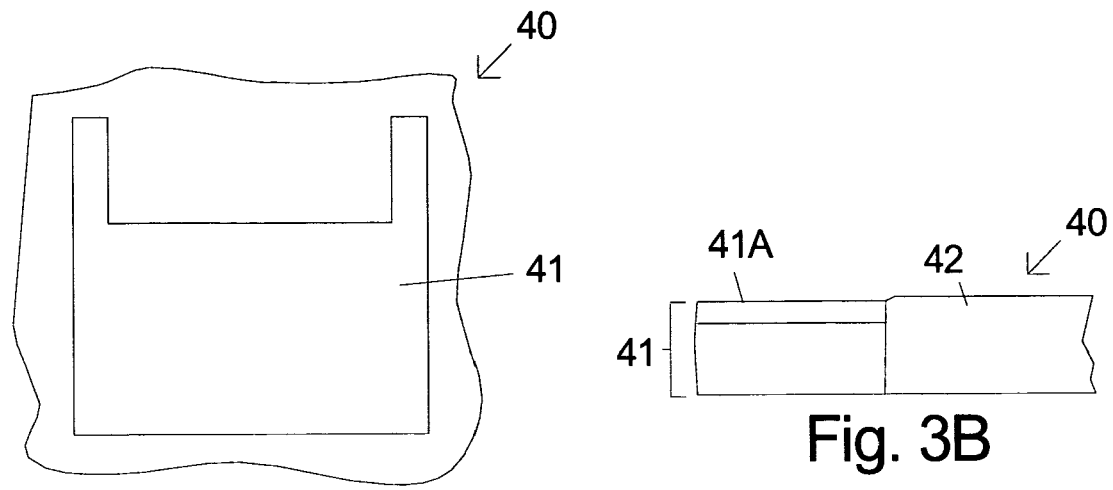
Fig. 3A
Fig. 3B
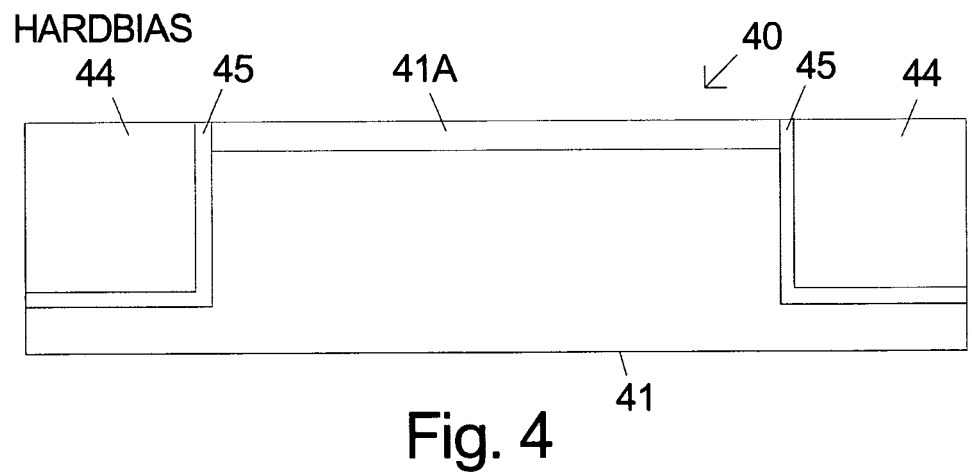
Fig. 4

METHOD OF FABRICATING A THIN FILM MAGNETIC SENSOR ON A WAFER

FIELD OF THE INVENTION

The invention relates to thin film magnetic transducers for sensing magnetic fields in magnetic recording media and more particularly to magnetic transducers used in magnetic disk drives.

BACKGROUND OF THE INVENTION

A typical prior art head and disk system 10 is illustrated in block form in FIG. 1. In operation the magnetic transducer 20 is supported by the suspension 13 as it flies above the disk 16. The magnetic transducer 20, usually called a "head" or "slider," is composed of elements that perform the task of writing magnetic transitions (the write head 23) in the magnetic medium included in the thin films 21 and reading the magnetic transitions (the read head 12). The electrical signals to and from the read and write heads 12, 23 travel along conductive paths (leads) 14 which are attached to or embedded in the suspension 13. The magnetic transducer 20 is positioned over points at varying radial distances from the center of the disk 16 to read and write circular tracks (not shown). The disk 16 is attached to a spindle 18 that is driven by a spindle motor 24 to rotate the disk 16. The disk 16 comprises a substrate 26 on which a plurality of thin films 21 are deposited. The thin films 21 include ferromagnetic material in which the write head 23 records the magnetic transitions in which information is encoded. The magnetic domains in the media on can be written longitudinally or perpendicularly. The read and write head portions of the slider are built-up in layers using thin film processing techniques. Typically the read head is formed first, but the write head can also be fabricated first. The conventional write head is inductive.

In a disk drive using perpendicular recording the recording head is designed to direct magnetic flux through the recording layer in a direction which is generally perpendicular to the plane of the disk. Typically the disk for perpendicular recording has a hard magnetic recording layer and a magnetically soft underlayer. During recording operations using a single-pole type head, magnetic flux is directed from the main pole of the recording head perpendicularly through the hard magnetic recording layer, then into the plane of the soft underlayer and back to the return pole in the recording head. The shape and size of the main pole and any shields are the primary factors in determining the track width.

Perpendicular magnetic recording is considered to be superior to longitudinal magnetic recording for ultra-high density magnetic recording. The increase demand for higher areal density has correspondingly led to increase demand to explore ways to reduce the width of the write pole piece, increase the write field strength, and improve the write field gradient. Experimental evidence and modeling have shown that a trailing shield single pole writer (SPT) design achieves a 4-5 dB media signal to noise advantage over writing with the trailing edge of an unshielded pole, increase in dHy/dx of the head field, reduce partial erasure, and improve saturation. These features improve transition sharpness (linear resolution) and permit higher coercive field media (improved stability).

Lead overlay designs for read sensors provide an advantage in improved stability and amplitude. The primary problem is the wide MRW. In this design, track width controlled by the separation of the electrically conductive leads on top of the sensor is smaller than the full width of the sensor. The lead overlay design moves the track edges away from the active sensor region. A prior art spin valve head 12A with overlaid leads is illustrated in FIG. 2 in a section view taken parallel to the air bearing surface (not shown). The leads 36a, 36b as shown in this particular embodiment include three sublayers: tantalum 37, chromium 38 and rhodium 39. The tantalum and chromium layers serve as seed layers for the rhodium. The leads are deposited in contact with the top surface of the spin valve sensor 35 and the hard bias structures 33a, 33b. The gap layer 31 underlies the two hard bias structures 33a, 33b and the sensor 35. The hard bias structures 33a, 33b are shown as a single element even though they include more than one layer, e.g., a chromium layer (not shown) followed by a CoPtCr layer (not shown). The spin valve 35 is also illustrated as a single entity for simplicity even though it includes several layers.

In published U.S. patent application 20040257713 by Pinarbasi, et al., Dec. 23, 2004, a lead overlay magnetoresistive sensor is described with leads having substantially vertical end walls to accentuate sense current near the ends of the leads. Insulating layers isolate the hard bias layers from the path of the sense current. After a first photoresist liftoff structure has been removed, a second layer of photoresist is formed and patterned. The second layer of photoresist does not have the usual undercut liftoff structure. Instead, the second layer of photoresist has substantially vertical walls. Lead material may be conveniently chosen from low resistance, substantially inert conductors such as rhodium, gold, ruthenium, and the like.

In published U.S. patent application 20030011943 by Webb, et al., Jan. 16, 2003, various embodiments of spin valve sensors with overlaid leads are described. A first embodiment for a bottom spin valve deposits a cap layer over the sensor then "notches" to expose the outer edges of the sensor. The overlaid leads are deposited in contact with the exposed side of the sensors. A second embodiment "notches" down through the free layer, as well as, the cap then refills with copper and NiFe before depositing the overlaid leads. A third embodiment "notches" down through the free layer and partially into the spacer and refills with NiFe before depositing the overlaid leads. A fourth embodiment "notches" down through the free layer and completely through the spacer and refills with NiFe before depositing the overlaid leads. A top spin valve embodiment notches through the cap, AFM layer and optionally into or through the pinned layer before forming the leads that contact the pinned layer.

In published U.S. patent application 20050007706 by Dovek, et al., Jan. 13, 2005 describes a design in which an additional antiferromagnetic layer is added under the overlaid leads in a bottom spin valve design. The extra antiferromagnetic layer extends over the hard-bias pads onto the top of the spin valve and is coterminous with the lead material. The longitudinal bias provided by the hard-bias pads extends, it is said, without attenuation right up to the edges of the leads, so that the physical and magnetic widths of the sensor are essentially identical.

SUMMARY OF THE INVENTION

An embodiment of the invention is a read head which can be used in a disk drive, and a method of fabricating the read head, with overlaid lead pads that contact the top surface of the sensor between the hardbias structures to define the electrically active region of the sensor. The hardbias structures are electrically insulated from direct contact with the sides of the sensor by a layer of insulating material. The contact area on the top of the sensor is minimized by sidewall deposition of a conductive material to form leads pads on a photoresist prior to formation of the remainder of the leads. By using sidewall deposition to form the lead pads, the contact area on the sensor is minimized which is an advantage of the invention. The layers for the sensor preferably include a cap of ruthenium. Ruthenium oxide is conductive, so it provides conductivity, as well as, corrosion protection. To fabricate the head the back edge of the sensor is milled first, then an insulating layer is deposited to insulate the back edge from contact with the leads. After a CMP, a photoresist pad is patterned over the area of the sensor to define the hardbias structures. The sensor stack is partially milled through (notched) to expose the sides of selected layers where the hardbias structures will be formed. A thin insulating layer is deposited to electrically insulate the sides of the sensor, then the hardbias structures are formed. A CMP is used to liftoff the resists for the hardbias structures. A photoresist for the leads is formed over the center of the sensor. Small pads of conductive material (overlaid lead pads) are formed on top of the sensor in a multi-step process. First a conductive material is deposited at a shallow angle to maximize the sidewall deposition on the photoresist, then ion-milling at a high angle is used to remove the conductive material from the field while leaving the sidewall material. An insulation layer is deposited on the lead material at a high angle, then milled at a shallow angle to remove insulation from the sidewall and leave it on field surfaces. A layer of conductive material is then deposited in electrical contact with the overlaid lead pads. The photoresist pad is stripped leaving the lead pads and the conductive lead material in place. If the sensor includes the ruthenium cap, it is preferably removed at this point with care being taken not to remove excessive amounts material which would damage the sensor. The prior art process can be resumed at this point to add additional lead layers which are formed in contact with the lead pads to extend the lead structure to the outside of the slider to provide the electrical contacts for the sensor.

BRIEF DESCRIPTION OF THE FIGURES

FIG. 3A is a symbolic illustration of a plan view of a wafer at a first stage in a process of fabricating a sensor with overlaid leads according to the invention.

FIG. 3B is a symbolic illustration of a section, taken perpendicular to the surface of a wafer after the back edge of the sensor has been milled and refilled with insulating material according to the invention.

FIG. 4 is a symbolic illustration of a section, taken perpendicular to the surface of a wafer after the hardbias structures have been formed at the sides of the sensor according to the invention.

DETAILED DESCRIPTION OF THE INVENTION AND THE PREFERRED EMBODIMENTS

Figure 1:
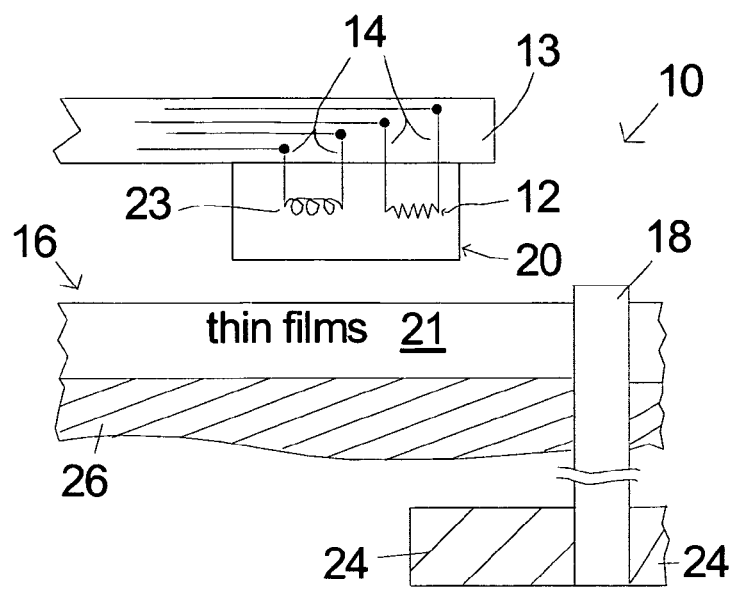
FIG. 1 is a symbolic illustration of selected components in a prior art disk drive.
Figure 2:
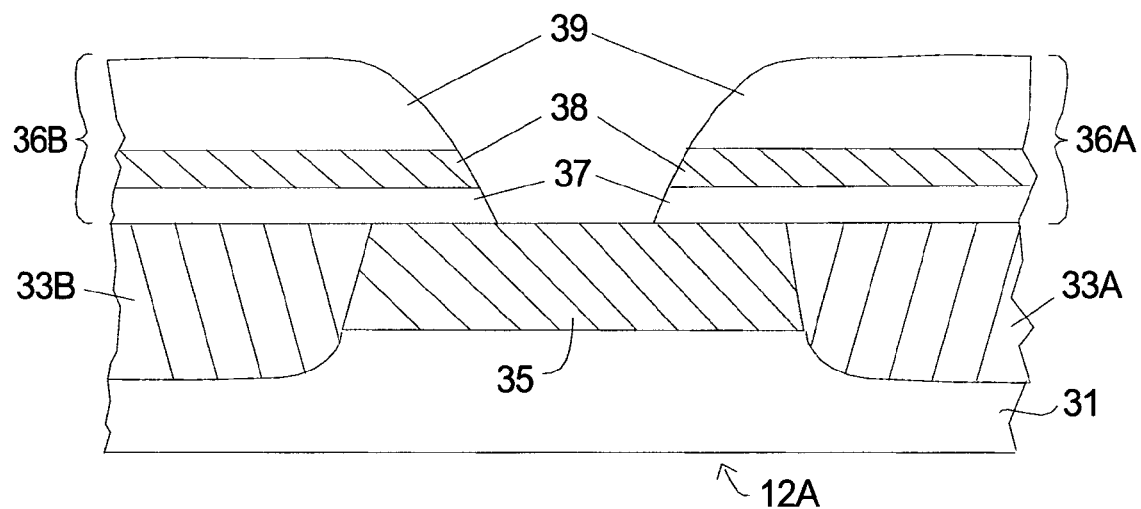
FIG. 2 is a symbolic illustration of a section, taken perpendicular to the air-bearing surface, of a prior art read sensor with overlaid leads.

A first embodiment of the invention is a read head with overlaid leads that only contact the top of the sensor along a confined area. FIG. 3A is a symbolic illustration of a plan view of a wafer 40 at a first stage in a process of fabricating a sensor with overlaid leads according to the invention. The figures are not according to scale, since the large range of sizes would make the drawings unclear. Except were noted the dimensions are according to the prior art. The stack of sensor material layers 41 has been milled through at the point of the process shown in FIG. 3A to define the back edge of the sensor. FIG. 3B is a symbolic illustration of a section, taken perpendicular to the surface of a wafer 40 after the back edge of the sensor has been milled and refilled with insulating material 42. The layers for the sensor preferably include cap 41A of ruthenium. Ruthenium oxide is conductive, so it provides conductivity, as well as, corrosion protection.

After a CMP, the hardbias structures 44 as shown in FIG. 4 are formed at the sides of the sensor. In a preferred embodiment the sensor stack 41 is only partially milled through (notched) to expose the sides of selected layers where the hardbias structures will be formed. A thin insulating layer 45 is deposited to electrically insulate the sides of the sensor before the hardbias structures are formed. The insulation layer is preferably alumina deposited by atomic layer deposition (ALD) and should be on the order of 50 to 75 angstroms thick on the sidewall. A CMP is used to liftoff the resists for the hardbias structures. The resulting structure is shown in FIG. 4. The internal layers of the hardbias structures are according to the prior art.

Figure 5:
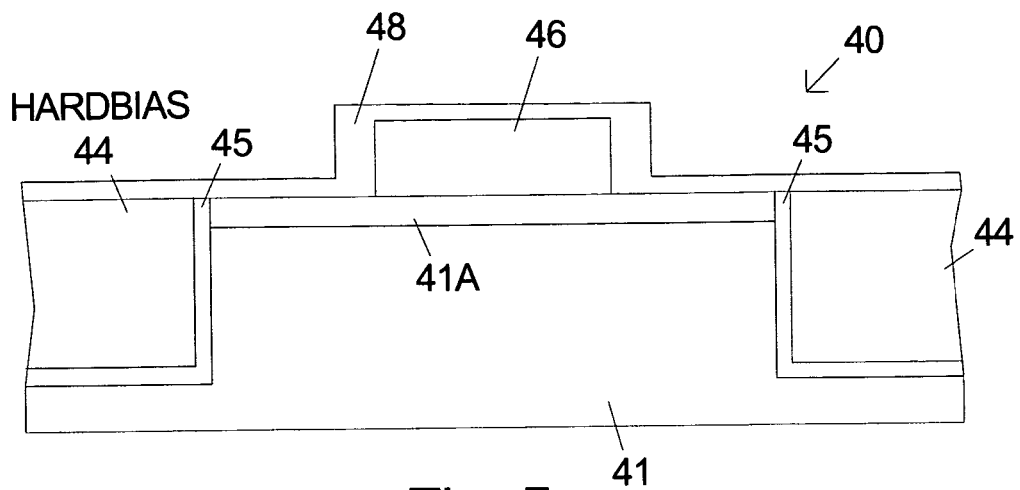
FIG. 5 is a symbolic illustration of a section, taken perpendicular to the surface of a wafer, subsequent to the state shown in FIG. 4, after the photoresist pad has been patterned over the center of the sensor and a layer of conductive material has been deposited according to an embodiment of the invention.

The photoresist pad 46 is patterned over the approximate center of the sensor to define the active region of the sensor that will lie substantially symmetrical between the leads as shown in FIG. 5. The width of the sensor material 41 between the hardbias structure is wider than the area between the overlaid pads which define the electrically active region of the sensor. Small pads of conductive material (overlay lead pads) will be formed on top of the sensor in a multi-step process. By using sidewall deposition to form the lead pads, the contact area on the sensor is minimized which is an advantage of the invention.

Figure 6:
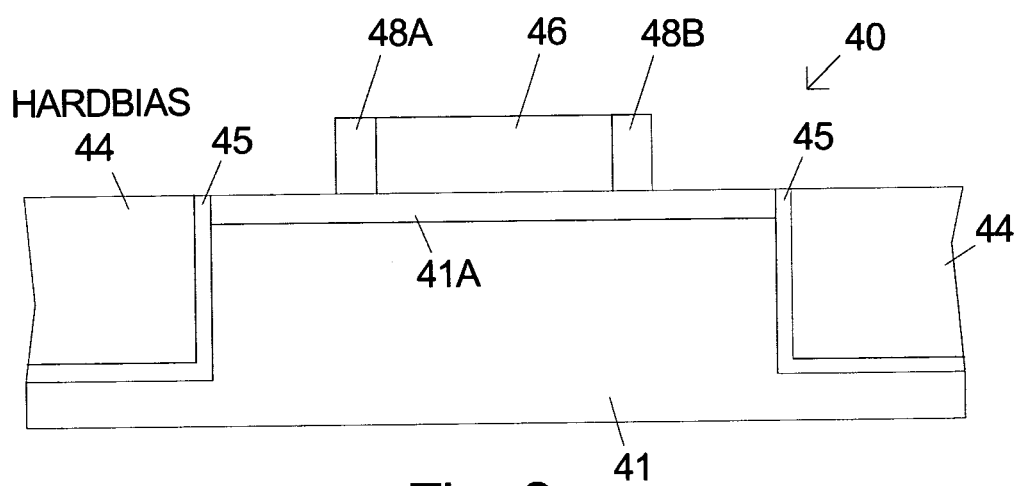
FIG. 6 is a symbolic illustration of a section, taken perpendicular to the surface of a wafer, subsequent to the state shown in FIG. 5, after the conductive material has been milled at a high angle according to an embodiment of the invention.

A conductive material 48 is deposited at a shallow angle to maximize the sidewall deposition on the photoresist. Then ion-milling at a high angle is used to remove the conductive material from the field while leaving only the sidewall material as shown in FIG. 6 to form lead overlay pads 48A, 48B. The lead pads formed on the sidewalls are between the hardbias structures and do not contact the hardbias structures. This defines and controls the area of conductive contact with beneficial results. It follows that the width of each lead pad must be less than one-half of a distance between the first and second hardbias structures.

Figure 7:
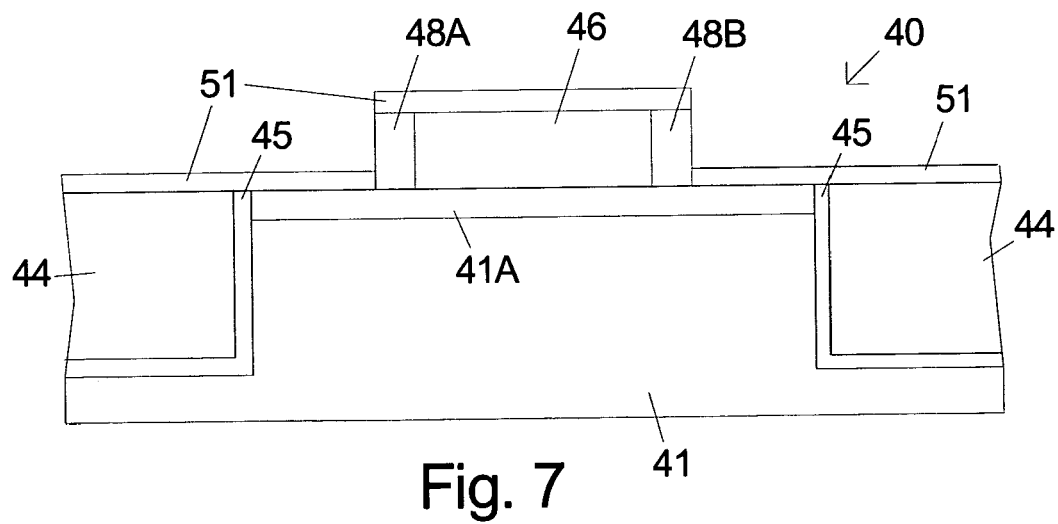
FIG. 7 is a symbolic illustration of a section, taken perpendicular to the surface of a wafer, subsequent to the state shown in FIG. 6, after a layer of insulation material has been deposited and then milled at a shallow angle to remove the insulating material from the sidewall according to an embodiment of the invention.
Figure 8:
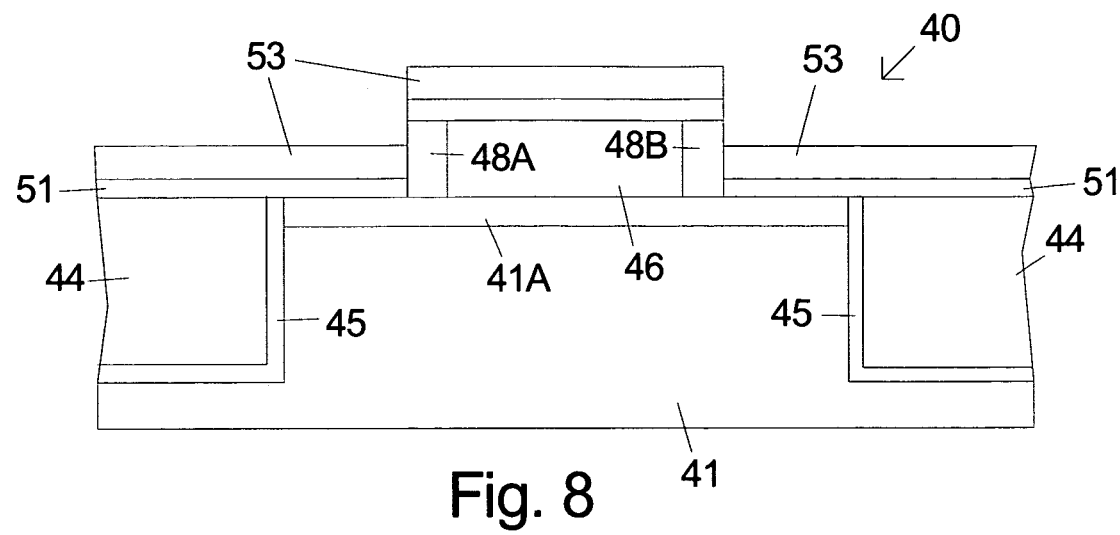
FIG. 8 is a symbolic illustration of a section, taken perpendicular to the surface of a wafer, subsequent to the state shown in FIG. 7, after a layer of conductive material has been deposited to make contact with the lead pad material on the sidewall according to an embodiment of the invention.

An insulation layer 51 is deposited on the lead material at a high angle and is then milled at a shallow angle to remove the insulation on side of the lead pads as shown in FIG. 7. The purpose of the insulation layer 51 is to limit the current carrying area on top of the sensor to area under the lead pads. Since the hardbias structures are electrically insulated from the sensor, it is not necessary that the insulation layer extend over the hardbias structures Next lead material 53 is deposited over the wafer to connect to the side of the lead pads as shown in FIG. 8. The lower portion of the sidewall lead pads are strengthened by the layer of lead material.

Figure 9:
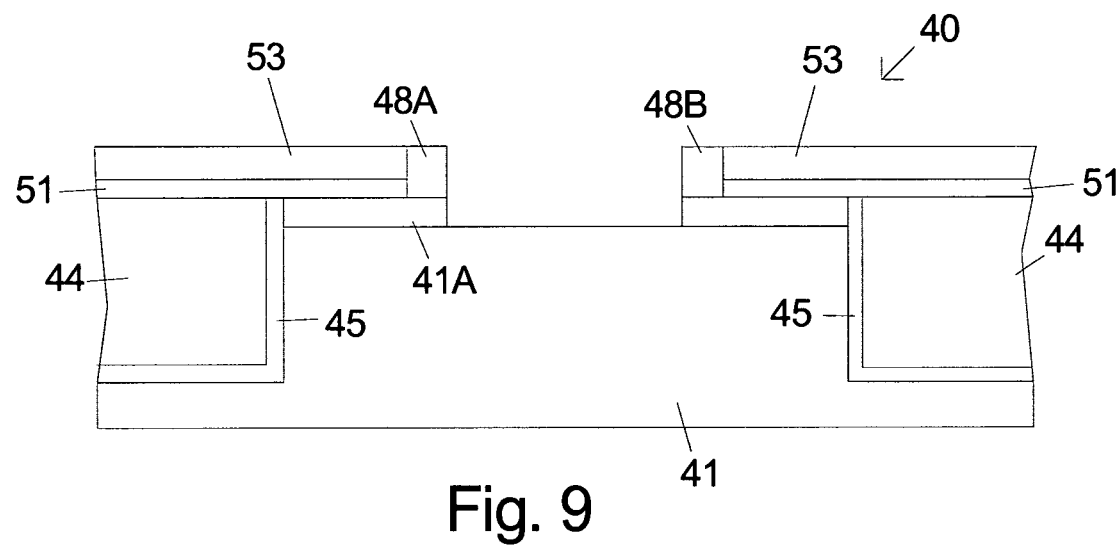
FIG. 9 is a symbolic illustration of a section, taken perpendicular to the surface of a wafer, subsequent to the state shown in FIG. 8, after the photoresist has been stripped between the lead overlay pads and after the cap layer on the sensor has been milled away according to an embodiment of the invention.

The photoresist is stripped off leaving the lead overlay pads 48A, 48B with the connecting lead material 53 exposed as shown in FIG. 9. The figure shows the ruthenium cap 41A having been milled through in the area of the sensor that is now exposed where the photoresist was formerly located. The ruthenium cap can be milled without the need for additional masking, but care should be taken not to damage the underlying sensor with excessive milling.

The remainder of the lead structure can be completed according to the prior art which typically builds additional layers of conductive material to shape and direct the leads to the outside of the sensor.

Figure 10:
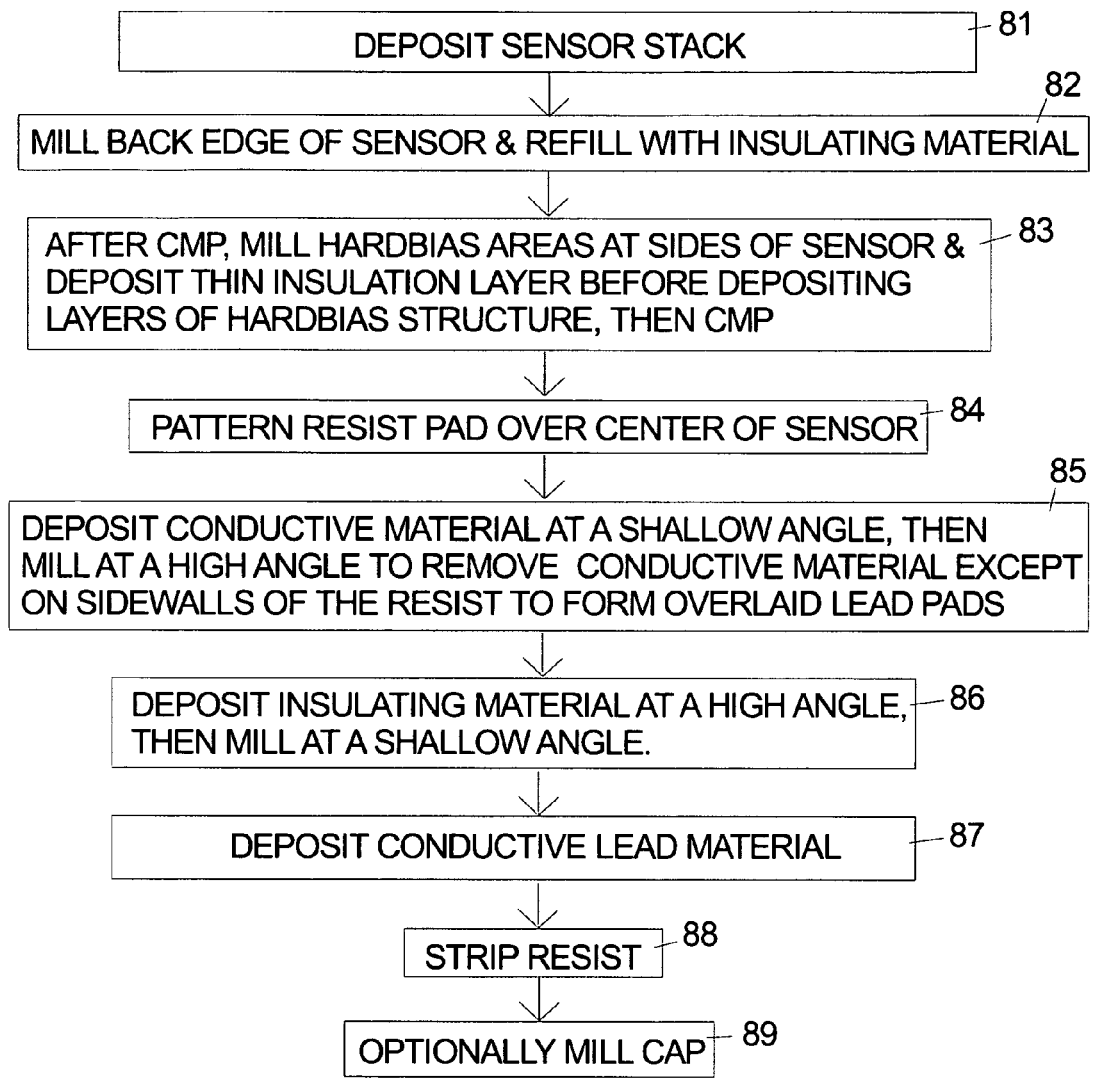
FIG. 10 is a flowchart of an embodiment of a method according to the invention.

FIG. 10 is a flowchart of an embodiment of a method according to the invention. The sensor layer stack is deposited first and should preferably include the ruthenium cap as described above 81. The back edge of the sensor is milled and the wafer is refilled with an insulating material which will insulate the back edge of the sensor from contact with the leads 82. After a CMP, the notches for the hardbias structures at the sides of the sensor are milled, a thin insulation layer is deposited to electrically insulate the hardbias structures from the sensor, and then the layers for the hardbias structures are deposited and a CMP is used to liftoff the resists for the hardbias structures 83. The separation between the hardbias structures is made wider than the predetermined target area for active region of the sensor. A resist pad is fabricated in the approximate center of the sensor between the hardbias structures 84. This pad defines the width of the active area of the sensor and it is narrower than the width of the sensor material between the hardbias structures. The conductive material for the lead pads is deposited at a shallow angle to maximize the sidewall deposition on the resist and then milling from a perpendicular angle is performed to remove the lead material from areas other than the sidewalls 85. The remaining sidewall lead material will form the lead pads. The insulating material is deposited at a perpendicular angle and milled at a shallow angle to remove the insulation on side of the lead pads 86. Conductive lead material is then deposited over the wafer to make electrical contact with the exposed sides of the lead pads 87. The resist is then stripped 88. If the ruthenium cap is part of the sensor, it is preferably removed at this stage with care being taken not to damage the active area sensor 89. The prior art process can be resumed at this point to add additional lead layers which are formed in contact with the lead material which is in contact with the lead pads to extend the lead structure to the outside of the slider.

The invention has been described with respect to particular embodiments, but other uses and applications for the thin film structures according to the invention will be apparent to those skilled in the art.

The invention claimed is:

1. A method of fabricating a thin film magnetic sensor on a wafer comprising the steps of:
    depositing a stack of thin film layers for a thin film magnetic sensor;
    forming first and second hardbias structures at predetermined locations at first and second sides of the thin film magnetic sensor;
    patterning a resist pad over a predetermined central area of the magnetic sensor selected to be an active area of the sensor between first and second overlaid lead pads;
    forming first and second lead pads from conductive material deposited on sidewalls of the resist pad in electrical contact with the magnetic sensor and electrically insulated from the hardbias structures; and
    depositing electrically conductive lead material over the wafer, the electrically conductive lead material making electrical contact with first and second lead pads.

2. The method of claim 1 wherein the step of forming first and second lead pads further comprises depositing a conductive material on the wafer including upon the sidewalls of the resist then removing the conductive material not on the first and second sidewalls so that the conductive material on the sidewalls does not make electrical contact with the hardbias structures and is in electrical contact with the magnetic sensor.

3. The method of claim 2 wherein the step of forming first and second lead pads further comprises the step, performed after the step of removing the conductive material, of depositing electrically insulating material over the wafer and then removing the electrically insulating material from the sidewalls of the first and second lead pads.

4. The method of claim 1 wherein the step of forming first and second lead pads further comprises depositing the conductive material at a shallow angle.

5. The method of claim 1 wherein the step of removing the conductive material not on the first and second sidewalls further comprises milling the conductive material at a high angle.

6. The method of claim 1 wherein the step of removing the electrically insulating material from the sidewalls of the first and second lead pads further comprises milling the electrically insulating material at a shallow angle.

7. The method of claim 1 further comprising steps of removing the resist pad and milling away a cap on the magnetic sensor in the area where the resist pad is removed between the lead pads.

8. The method of claim 1 further comprising steps of forming a back edge of the magnetic sensor by milling through the layers for the magnetic sensor on the wafer at a predetermined location and refilling the wafer with an electrically insulating material.

9. The method of claim 1 wherein the step of depositing a layer of electrically insulating material before depositing layers for the first and second hardbias structures further comprises using atomic layer deposition to deposit a thin layer of alumina.

10. The method of claim 1 wherein the step of forming first and second hardbias structures further comprises electrically insulating the first and second hardbias structures from the magnetic sensor by depositing a layer of electrically insulating material before depositing layers for the first and second hardbias structure.

* * * * *